United States Patent [19]
McCully

[11] Patent Number: 6,128,632
[45] Date of Patent: Oct. 3, 2000

[54] METHODS FOR APPLYING RUBI ANNOTATION CHARACTERS OVER BASE TEXT CHARACTERS

[75] Inventor: Nathaniel M. McCully, Palo Alto, Calif.

[73] Assignee: Apple Computer, Inc., Cupertino, Calif.

[21] Appl. No.: 08/813,834

[22] Filed: Mar. 6, 1997

[51] Int. Cl.[7] .................................................. G06F 17/21
[52] U.S. Cl. .......................................... 707/512; 707/517
[58] Field of Search ..................................... 707/519, 512, 707/517, 518, 523, 529, 542; 345/142

[56] References Cited

U.S. PATENT DOCUMENTS

| | | | |
|---|---|---|---|
| 5,097,417 | 3/1992 | Ukon | 364/419 |
| 5,432,890 | 7/1995 | Watanabe | 395/100 |
| 5,438,512 | 8/1995 | Mantha et al. | 364/419.1 |
| 5,475,805 | 12/1995 | Murata | 395/145 |
| 5,802,532 | 9/1998 | Nakayama et al. | 707/519 |

OTHER PUBLICATIONS

Unknown, "*EGWord*" for Macintosh, 1992, Ergosoft Corporation, Japan.

*Primary Examiner*—Joseph H. Feild
*Assistant Examiner*—Robert D Bourque
*Attorney, Agent, or Firm*—Beyer Weaver & Thomas, LLP

[57] ABSTRACT

Improved techniques for formatting annotated text are disclosed. Among other things, the techniques can be implemented to avoid overlapping of rubi characters to improve readability of text documents that use rubi annotation characters. One technique provides for tracking base text when an overall length of spaced apart rubi characters is greater that the overall length of the underlying selected base text. Another technique allows rubi characters to be tracked out when the overall length of the underlying selected base text is greater than the overall length of suitably spaced apart rubi characters. Yet another technique allows a rubi character to overhang with respect to a right or left edge of the selected base text.

15 Claims, 14 Drawing Sheets

METHODS FOR APPLYING RUBI ANNOTATION CHARACTERS OVER BASE TEXT CHARACTERS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights.

BACKGROUND OF THE INVENTION

1. Field of the Invention

The present invention relates generally to formatting in word processing programs, and more particularly, to methods for formatting text documents implementing rubi annotation characters.

2. Description of the Related Art

The Japanese language is known as one of the worlds most complex languages to learn, understand and speak. For use on computers, characters used in the Japanese language are generally divided into two levels based on a Japan Industry Standard (JIS). A first level known as "sui jun-1", contains about 2,965 more common Japanese characters used for basic communication. The second level is known as "sui jun-2", and contains about another 3,964 more complex and less frequently used characters. Therefore, even native Japanese speaking people have difficulty reading and understanding all Japanese characters without referencing a dictionary. To assist readers to quickly understand and pronounce less frequently used Japanese characters, it is a common practice to annotate these characters with "rubi" characters. As is well known, rubi characters are typically Japanese syllabic "kana" characters that are placed over "kanji" characters to assist the reader in quickly pronouncing the underlying kanji characters (or combination of kanji characters) in phonetic Japanese without referencing a dictionary.

FIG. 1A is a text representation of Japanese kanji characters 12 having rubi characters 10. As shown, rubi characters 10 annotate the underlying kanji characters 12. In typical cases, kanji characters 12 have one or two rubi characters 10 overlying each of the kanji characters 12. However, certain kanji characters are pronounced with more than two syllables, requiring three or more rubi characters to annotate such pronunciation. Unfortunately, when multiple rubi characters 10 annotate complex kanji characters 12, conventional Japanese word processing programs pack together all of the overlying rubi characters 10 over the selected kanji character 12. Unfortunately, packing all of the annotating rubi characters 10 over a fixed space tends to overcrowd (and sometimes overlap) the rubi characters which makes reading the rubi characters difficult and distracting.

FIG. 1B is a Japanese phrase having annotating rubi characters. In this example, a kanji character 14 lies between kana character 16 and 18, and is annotated with several rubi characters 30. Also shown are kanji characters 20, 22, 24, and 26. The small circle at the end of the kanji and kana character phrase is a period 28. For comparison purposes, kanji characters 20 and 22 only have two rubi characters 34 and 32 respectively. Because only two rubi characters annotate a single kanji character, the spacing between the annotated rubi characters is sufficiently spaced to allow a user to read the rubi characters without distraction. On the other hand, kanji character 14 is annotated with five rubi characters 30. As illustrated, the five rubi characters 30 overlap one another which unfortunately makes reading of the rubi characters difficult. The exemplary annotation of kanji character 14 was performed using E.G. Word™, by Ergo Soft, Tokyo, Japan.

Accordingly, when the aforementioned overlapping occurs, readers will generally have to stop and decipher each of the annotating rubi characters. Once the rubi characters are deciphered, if possible, the reader may continue reading the underlying base text. However, because the reader had to stop his reading flow to decipher the overlapping rubi characters 30, the reader's train of thought may have been obscured. As a result, the reader will generally back-track and re-read the preceding sentence to recapture context.

As described above, many conventional Japanese computer word processing programs are capable of applying rubi annotation to assist readers in phonetically sounding out and understanding particularly difficult Japanese characters. However, these programs are not well suited to handle rubi annotation when more than two rubi characters annotate a single underlying kanji character. The publishing industry typically implements expensive typesetting machines that have complex mechanical devices for performing accurate custom rubi formatting. However, custom rubi formatting typically involves intensive manual labor to twist levers and rotate gears until the overlying rubi characters were sufficiently spaced apart. As a result, custom rubi formatting for most documents is a prohibitively expensive task.

In view of the foregoing, there is a need for methods for performing rubi annotation without causing rubi character overcrowding and overlapping.

SUMMARY OF THE INVENTION

Broadly speaking, the present invention provides rubi annotation methods that track-out underlying selected base text or rubi annotation text based on their respective lengths. It should be appreciated that the present invention can be implemented in numerous ways, including as a process, an apparatus, a system, a device, a method, or a computer readable medium. Several inventive embodiments of the present invention are described below.

In one embodiment, a method for annotating text is disclosed. The method includes selecting at least one base text character and defining at least one annotating character to be associated with the at least one base text character. The method further includes determining a length for the at least one base text character and the at least one annotating character, and calculating a difference length between the determined length of the at least one base text character and the at least one annotating character. Then, distributing the difference length before and after the at least one base text character.

In another embodiment, a second method for annotating text is disclosed. The method includes selecting at least one base text character and defining at least one annotating character to be associated with the at least one base text character. The method further includes determining a length for the at least one base text character and the at least one annotating character, and calculating a difference length between the determined length of the at least one base text character and the at least one annotating character. Then, distributing the difference length before and after the at least one annotating character.

In yet a further embodiment, an annotation alignment method is disclosed. The method includes selecting at least one base text character, and defining annotating characters to be associated with the at least one base text character. The method then determines a leftmost edge and a rightmost edge of the annotating characters, and identifying a leftmost and a rightmost edge of the selected at least one base text character. Next, the method aligns one of the leftmost edge and the rightmost edge of the annotating characters with one of the leftmost and rightmost edge of the selected at least one base text character.

In still a further embodiment, a computer readable media containing program instructions for annotating text is disclosed. The computer readable media includes program instructions for selecting at least one base text character, and program instructions for defining at least one annotating character to be associated with the at least one base text character. The computer readable media further includes program instructions for determining a length for the at least one base text character and the at least one annotating character, and program instructions for calculating a difference length between the determined length of the at least one base text character and the at least one annotating character. And, program instructions for distributing the difference length before and after the at least one base text character.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 1A shows Japanese kanji characters having annotating rubi characters.

FIG. 1B shows Japanese kanji characters having overlapping annotating rubi characters.

DETAILED DESCRIPTION OF THE PREFERRED EMBODIMENTS

An invention is described for rubi annotation that advantageously tracks-out underlying selected base text or rubi annotation text based on their respective lengths to prevent rubi annotation text overcrowding. In the following description, numerous specific details are set forth in order to provide a thorough understanding of the present invention. It will be obvious, however, to one skilled in the art, that the present invention may be practiced without some or all of these specific details. In other instances, well known process operations have not been described in detail in order not to unnecessarily obscure the present invention.

Figure 2A:
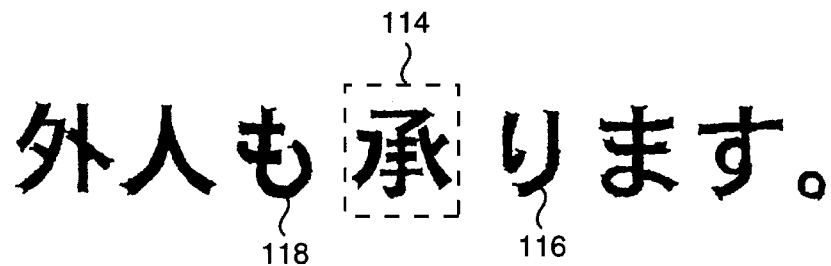
FIG. 2A shows a Japanese kanji character being selected for rubi annotation in accordance with one embodiment of the present invention.
Figure 2B:
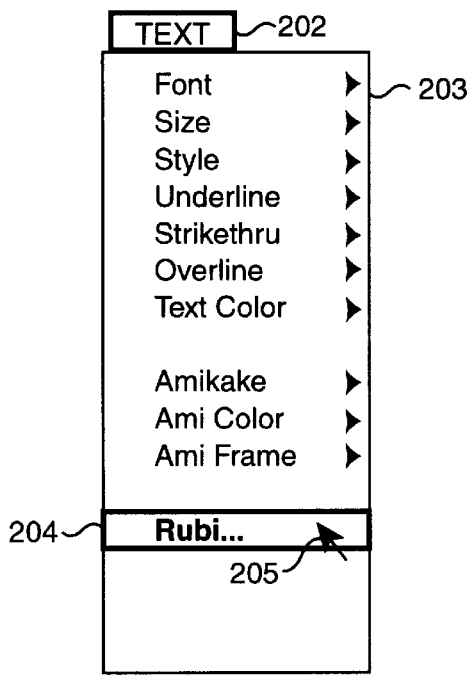
FIG. 2B is a pull-down menu used for selecting a rubi annotation feature in accordance with one embodiment of the present invention.

FIG. 2A shows a Japanese base text phrase of kanji and kana characters. To apply rubi annotation in accordance with one embodiment of the present invention, a kanji character 114 is first selected using any suitable selection technique. Located on each side of kanji character 114 is a kana character 118 and a kana character 116. Once the user has selected kanji character 114, a user may proceed to a text menu bar 202 that displays a pull-down window 203, as shown in FIG. 2B. Pull-down menu 203 is shown having various selection features which include a rubi selection feature 204.

Figure 2C:
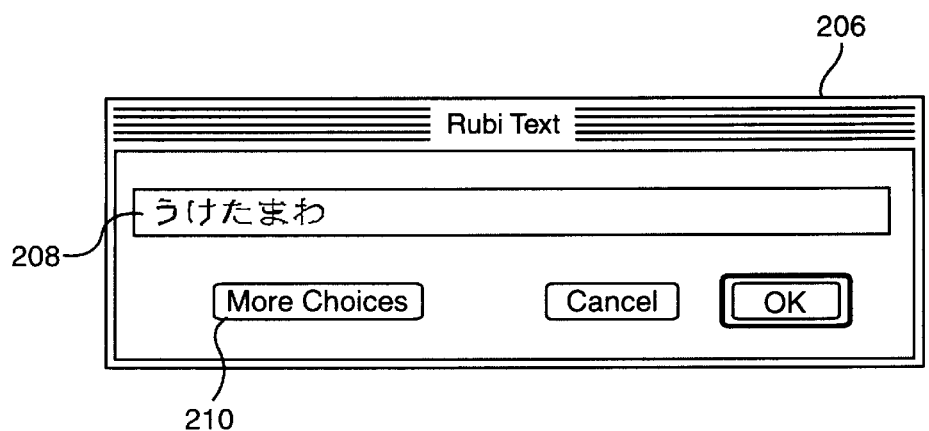
FIG. 2C illustrates a simple rubi text dialog in accordance with one embodiment of the present invention.

Once rubi selection feature 204 is chosen by placing a pointer 205 over rubi selection feature 204, a user will preferably be presented with a simple rubi text dialog 206 as shown in FIG. 2C. Once simple rubi text dialog 206 is active, the user may type-in suitable kana characters that make up the rubi annotating text for the selected kanji character 114 of FIG. 2A. As shown, a user may type-in the desired kana characters into a rubi field 208 that may receive any suitable number of characters for annotation purposes. If the user selects a "more choices" 210 button, an expanded version of simple rubi text dialog 206 will be presented to the user.

Figure 2D:
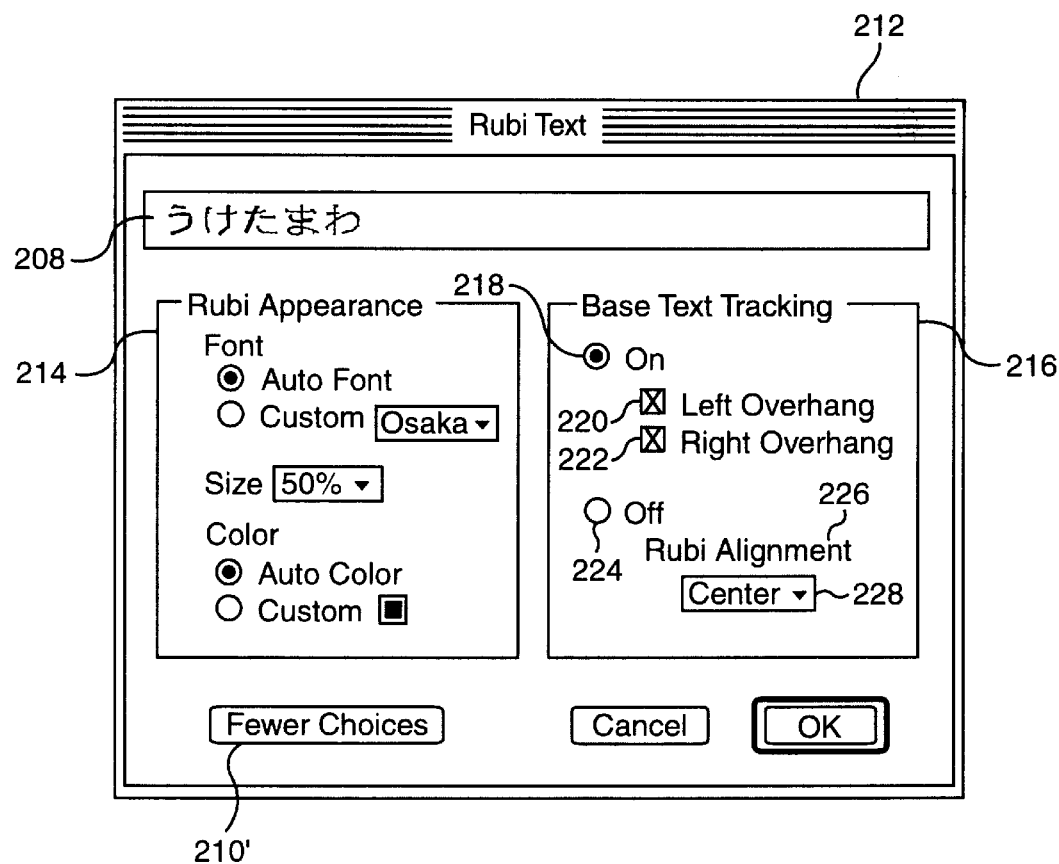
FIG. 2D illustrates a custom rubi text dialog in accordance with one embodiment of the present invention.

FIG. 2D illustrates a custom rubi text dialog 212 that appears once more choices 210 button is selected in accordance with one embodiment of the present invention. In this example, the previously typed-in rubi characters are again presented in rubi field 208. Of course, if the user desires to modify the rubi characters, any such modification may easily be made in rubi field 208. Custom rubi text dialog 212 is generally provided with a rubi appearance control panel 214 and a base text tracking control panel 216. In rubi appearance control panel 214, the user may select rubi fonts from a custom font list or alternatively select auto font. Auto font will preferably make the rubi characters identical to the underlying base text and any such custom fonts may be selected from a pull-down menu that is currently displaying "OSAKA" font.

In addition, the user may select a relative percentage size for the rubi characters base on the size of the underlying base text (i.e., underlying kanji character). In this example, the size of the rubi characters is shown selected to 50 percent of the size of the underlying base text. Of course, other sizes may be selected from a pull-down menu that presents a user with choices such as 25 percent, 33 percent, 75 percent, or any other fixed size. In a preferred embodiment, a default size for the rubi text will be about 50 percent of the base text. Accordingly, if the underlying base text changes in size, the annotating rubi text will also automatically change in size to retain the selected percentage. In a further embodiment, a color selection feature is provided so a user may present the annotating rubi text in distinguishing colors. If "custom" is selected, the user may select any suitable color from a color selection pull-down palette. On the other hand, if "auto color" is selected, a default color that is identical to the underlying base text will be applied to the rubi text.

In base text tracking control panel 216, a user may either select to have base text tracking "on" 218 or base text tracking "off" 224. When base text tracking is on 218, the user is presented with a further option of selecting a left overhang 220 and a right overhang 222. On the other hand, if base text tracking is off 224, a rubi alignment 226 may be activated when a pull-down menu 228 is selected. In this example, "center" alignment is selected, but pull-down menu 228 also provides the flexibility of left alignment or right alignment.

As will be described in greater detail below, when base text tracking is "on" 218 the underlying base text or the overlying rubi characters will be appropriately tracked (i.e., spaced apart) to prevent unsightly overcrowding that tends to distract readers. In general, when an overall length of suitably spaced apart rubi characters is greater that the overall length of underlying selected base text, the base text will be tracked out to avoid overlapping. Conversely, when the overall length of the underlying selected base text is greater than the overall length of suitably spaced apart rubi characters, the rubi characters will be tracked out. In addition, when left overhang 220 or right overhang 222 is selected, one rubi character is preferably allowed to overlie an adjacent non-selected base text character. When rubi characters are allowed to overlie an adjacent non-selected base text, the base text is more pleasing to read since gaps between underlying base text characters are minimized and are more evenly distributed.

Figure 3:
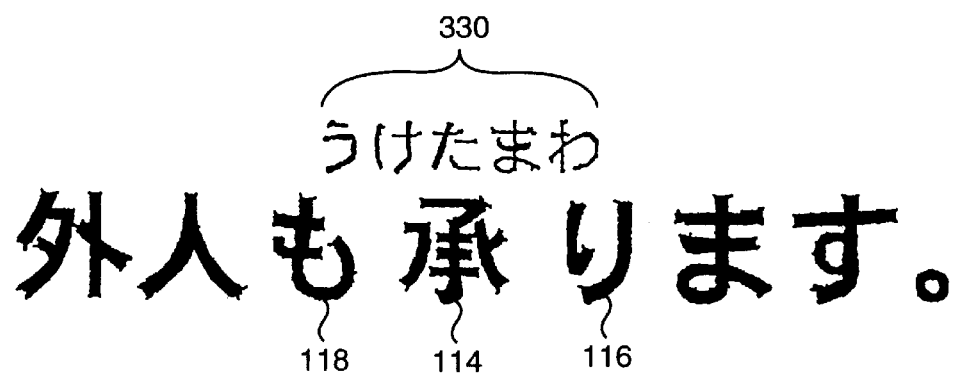
FIG. 3 shows the selected base text of FIG. 2A after annotation rubi characters are applied in accordance with one embodiment of the present invention.

FIG. 3 shows the base text of FIG. 2A after appropriate rubi characters 330 are applied for selected kanji character 114 in accordance with one embodiment of the present invention. As illustrated, the overlying rubi characters 330 have been evenly distributed over the underlying base text characters that have been appropriately tracked. Because left overhang 220 and right overhang 222 is selected (as shown in FIG. 2D), rubi characters 330 have one rubi character placed above kana character 118 and one rubi character paced above kana character 116.

Figure 4A:
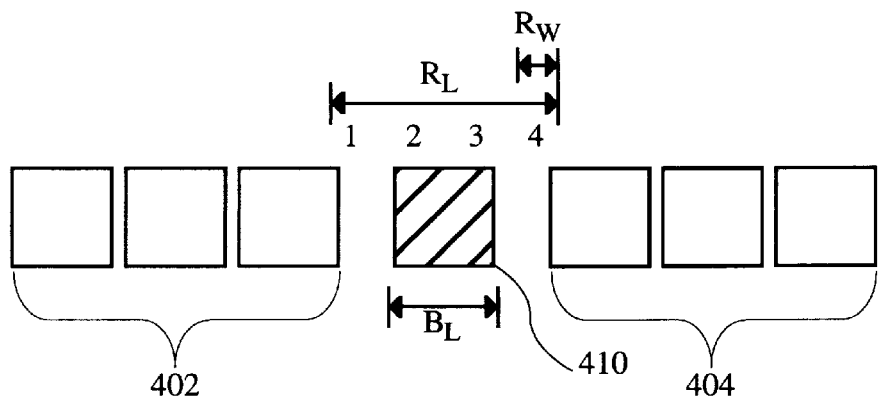
FIGS. 4A through 4C illustrate preferred base text tracking methods for the application of annotation rubi characters in accordance with one embodiment of the present invention.
Figure 4B:
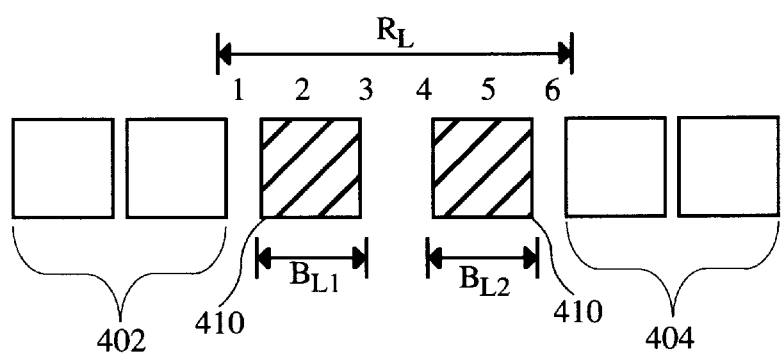
Figure 4C:
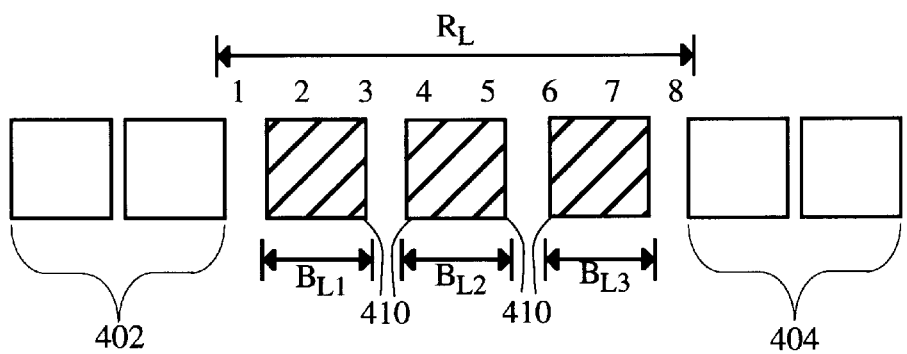

FIGS. 4A through 4C illustrate preferred tracking methods when applying rubi annotating text over base text in accordance with one embodiment of the present invention. FIG. 4A is a box and circle diagram where boxes designate base text characters and circles designate annotating rubi characters. In this example, un-selected base text characters are denoted by boxes 402 and boxes 404, and selected base text is denoted by base text character 410. As described above, once base text character 410 is selected, and four rubi characters are typed into rubi field 208 of either "simple" or "custom" rubi text dialogs of FIG. 2C or 2D respectively, the underlying base text is appropriately tracked (i.e., spaced apart) to ensure a more pleasing distribution of the overlying rubi characters.

In this manner, the applied rubi characters do not overlap rendering them incomprehensible. In this example, it will be assumed that base text tracking is "on" 218 as described with reference to FIG. 2D. Because there is only one selected underlying base character 410 having a length ($B_L$), a rubi length ($R_L$) is determined for the annotating rubi characters 1, 2, 3, and 4. In this example, $R_L$ is greater than $B_L$ ($R_L > B_L$) which therefore requires that $B_L$ be subtracted from $R_L$ to ascertain the length of the difference ($D_L$). Once $D_L$ is ascertained, $D_L$ is preferably distributed evenly between the non-selected base text characters 402 and 404 and the selected base text character 410. In other words, the spacing on each side of the selected base text character 410 is tracked out (i.e., spread apart) to avoid overlapping of the rubi characters. In this example, it should be understood that $R_L$ is composed of four rubi characters, each having an associated rubi width ($R_W$). Therefore, $R_L$ is preferably ($4 \times R_W$).

FIG. 4B illustrates a scenario where two underlying base text characters 410 are selected for annotation, and six rubi characters are annotating the selected base text characters. In this example, base text characters 410 each have widths of $B_{L1}$ and $B_{L2}$ that are added together to determine an overall base text length $B_L$. The six (6) rubi annotating characters preferably have a rubi length of $R_L$. Once the lengths are determined for both the rubi annotating text and the underlying selected base text 410, the base text length $B_L$ is subtracted from the rubi length $R_L$ to arrive at a different length $D_L$ (i.e., when $R_L > B_L$). Once $D_L$ is determined, $D_L$ is preferably distributed half (½$D_L$) between each of the two selected base text characters 410, and one-fourth (¼$D_L$) between each of the selected base characters 410 and non-selected adjacent characters. This preferred distribution is generally applied for a case where only two base text characters are selected and $R_L > B_L$.

FIG. 4C illustrates a scenario where there are three selected base text characters 410, and eight (8) annotating rubi characters overlying the three selected base text characters 410. In this case, the three selected base text characters will preferably have lengths $B_{L1}$, $B_{L2}$, and $B_{L3}$ respectively. Once the individual base text lengths for the selected base text characters are added to arrive at a total based length $B_L$, $B_L$ is subtracted from an overall rubi length $R_L$ for the eight annotating rubi characters (i.e., when $R_L > B_L$). Once subtracted, a different length $D_L$ is evenly distributed between each of the three selected base text characters, as well as between the outer selected base text characters and non-selected base text characters.

Figure 5A:
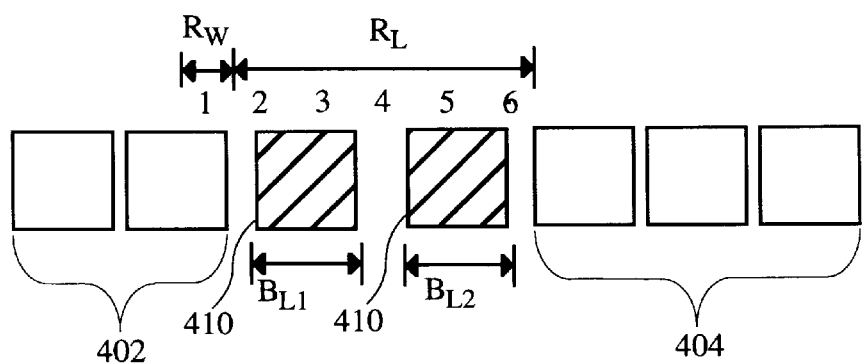
FIGS. 5A through 5D illustrate embodiments where a user selects a left overhang, a right overhang or both right and left overhang for the annotation rubi characters in accordance with one embodiment of the present invention.

FIGS. 5A through 5D illustrate embodiments where a user selects a left overhang, a right overhang or both right and left overhang for the applied rubi annotating characters in accordance with one embodiment of the present invention. FIG. 5A shows a scenario where left overhang is selected from base text tracking control panel 216 of FIG. 2D. By way of example, when left overhang 220 is checked and right overhang box 222 is not checked and base text tracking is "on" 218, the underlying base text characters are preferably tracked as shown. In this embodiment, the widths of rubi characters 2, 3, 4, 5, and 6 are calculated to ascertain an overall rubi length ($R_L$). Accordingly, when left overhang is selected, the rubi length $R_L$ is determined without taking the width of rubi character 1 into account.

In this example, the selected base text characters 410 have base lengths of $B_{L1}$ and $B_{L2}$ that are added to produce a total base text length $B_L$. Next, $B_L$ is subtracted from $R_L$ to arrive at a different length $D_L$ (i.e., when $R_L > B_L$). Once $D_L$ is determined, the different length $D_L$ is preferably distributed half (½$D_L$) between each of the selected base text characters and one-fourth (¼$D_L$) between the non-selected base text characters and the selected base text characters. In this embodiment, rubi annotation character 1 is shown lying over a non-selected base text character 402. By providing left or right overhang, the user is further provided with a facility of distributing such annotating rubi characters in a more pleasing and easy to read fashion to avoid introducing any eye-disturbing formatting.

Figure 5B:
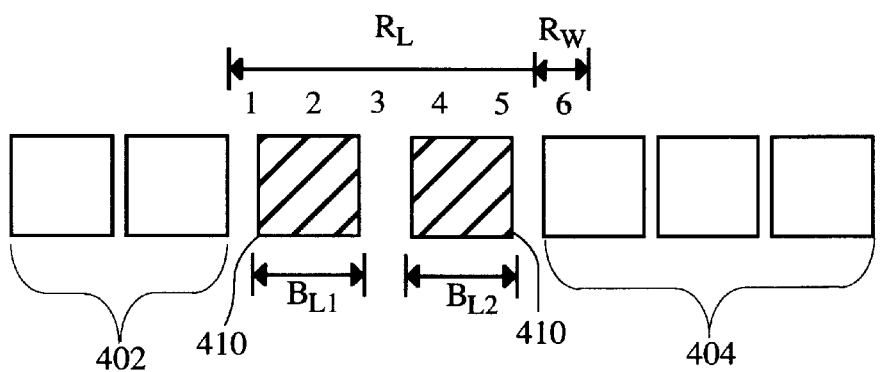

FIG. 5B shows a converse scenario where a right overhang is selected from base text tracking control panel 216 of FIG. 2D. In this case, left overhang is turned off and a new rubi length is calculated including only rubi characters 1, 2, 3, 4 and 5 (i.e., excluding the rubi width of rubi character 6). As described above, the overall base text length preferably includes $B_{L1}$ and $B_{L2}$ to arrive at an overall base text length $B_L$ for the underlying selected base text. $B_L$ is then subtracted from $R_L$ to arrive at a different length $D_L$ (i.e., when $R_L > B_L$). $D_L$ is then distributed half (½$D_L$) between each of the selected base text characters 410, one-fourth (¼$D_L$) between non-selected base text characters 402 and a selected base text character 410, and one-fourth (¼$D_L$) between the non-selected base text characters 404 and the selected base text character 410.

Figure 5C:
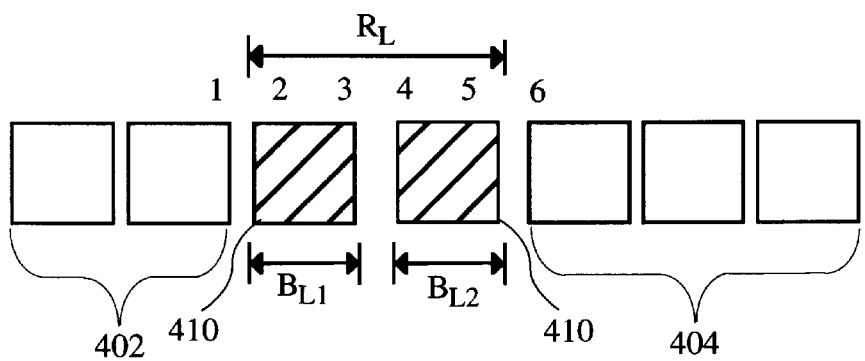

FIG. 5C shows a scenario where both left overhang and right overhang are selected from base text tracking control panel 216 of FIG. 2D. Accordingly, both annotation rubi characters 1 and 6 are placed above adjacent non-selected base text characters. As such, the overall rubi length $R_L$ is only determined for rubi characters 2, 3, 4 and 5 (i.e., excluding rubi characters 1 and 6). The overall base text length $B_L$ for the selected base text characters is subtracted from $R_L$ to produce a $D_L$. $D_L$ is then distributed one-fourth (¼$D_L$) between the selected and non-selected base text characters, and one-half (½$D_L$) between the selected base text characters, as described above.

Figure 5D:
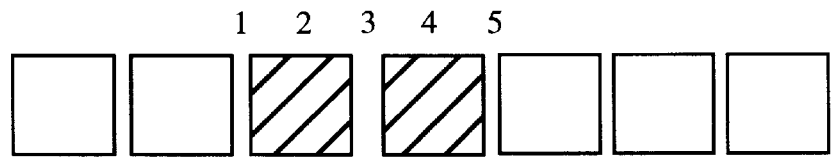

FIG. 5D illustrates a scenario where the overlying rubi characters do not completely overhang the underlying non-selected base text characters when both right and left overhang has been selected. In any event, base text tracking is performed as described with reference to FIG. 5C. That is, when left and right overhang is selected from the base text tracking control panel 212, annotating rubi characters 1 and 5 are not included in the overall rubi length calculation when the different length $D_L$ is determined. Once the difference length $D_L$ is determined, the distribution is performed for cases where only two base text characters are selected and $R_L > B_L$.

Figure 6A:
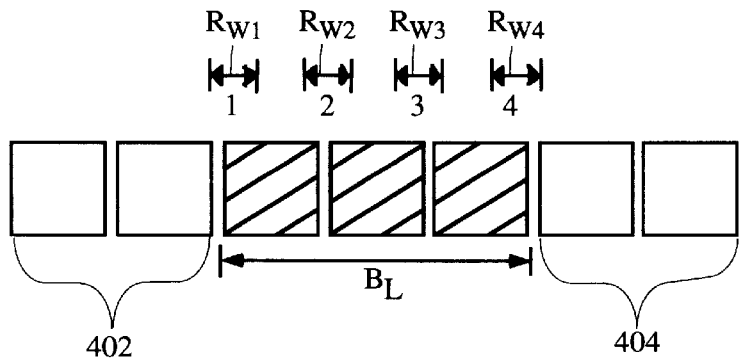
FIGS. 6A and 6B illustrate embodiments where the annotating rubi characters have a length that is less than the underlying selected base text characters in accordance with one embodiment of the present invention.
Figure 6B:
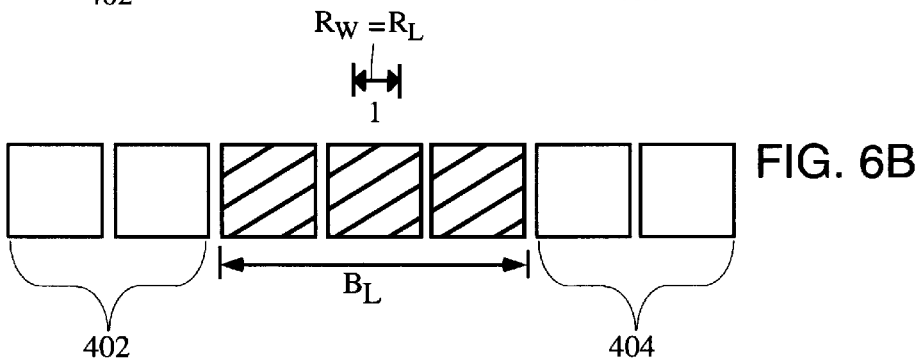

FIGS. 6A and 6B illustrate circumstances where the annotating rubi text length is less than the underlying selected base text characters (i.e., $R_L < B_L$). In this example, a base length $B_L$ for each of the three selected base text characters is determined and the rubi widths ($R_W$) of each rubi characters are added to ascertain a total rubi length $R_L$. By way of example, the rubi length for rubi characters 1, 2, 3, and 4 is calculated by adding $R_{W1}$, $R_{W2}$, $R_{W3}$, and $R_{W4}$. Once $R_L$ is determined, $R_L$ is subtracted from $B_L$ to ascertain a different length $D_L$.

In this case, because the underlying text is greater than the overlying annotated rubi characters, the base text will not be tracked, however, the overlying rubi text will be tracked out to provide a more pleasing and easy to read distribution of the rubi characters. Accordingly, $D_L$ is preferably distributed evenly between each of the provided rubi characters. FIG. 6B illustrates a scenario where only one rubi character having a width of $R_W$ (which is the same as the overall rubi length $R_L$) is centered over three underlying base text characters having a width $B_L$.

Figure 7A:
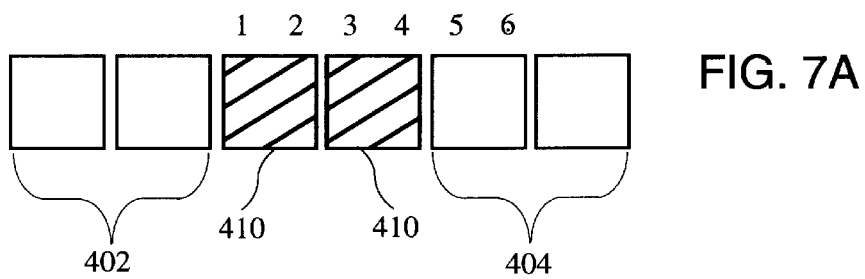
FIGS. 7A through 7C illustrate rubi alignment features in accordance with one embodiment of the present invention.
Figure 7B:
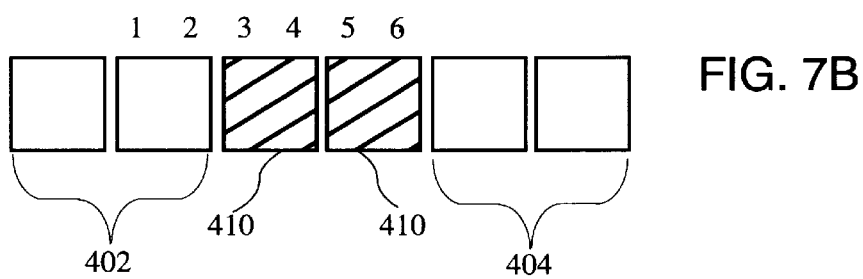
Figure 7C:
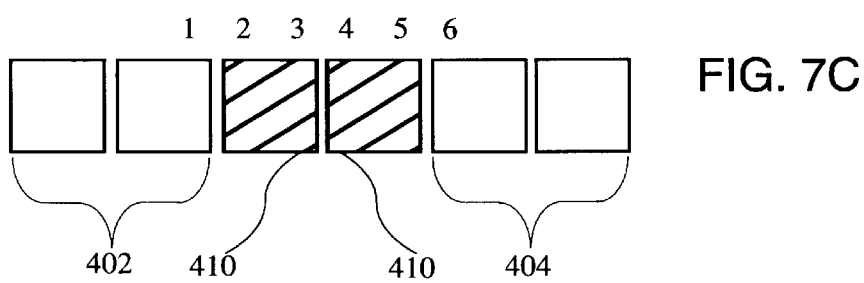

FIGS. 7A through 7C illustrate rubi alignment features in accordance with another embodiment of the present invention. As described above, when a right, left or center alignment option is selected from base text tracking control panel 216 of FIG. 2D, base text tracking is toggled "off." When this happens, base text tracking and rubi text tracking will not be active to allow precise rubi alignment. As shown in FIG. 7A, when left alignment is selected, the rubi annotation characters 1 through 6 are shifted to the right. In this manner, the leftmost rubi character is aligned with a leftmost edge of the leftmost underlying selected base text character 410. Accordingly, rubi characters 5 and 6 will preferably lie over adjacent non-selected base text characters 404.

Conversely, when right alignment is selected as shown in FIG. 7B, the rightmost rubi character 6 is preferably aligned with the rightmost selected underlying base text character 410. In this manner, the remaining rubi characters will be shifted to the left over non-selected base text characters 402. Further, FIG. 7C illustrates a scenario where center alignment is selected. In this embodiment, the overlying annotation rubi characters 1 through 6 are preferably centered about a center point of the selected underlying base text characters 410. As such, rubi characters number 1 and number 6 are placed over the non-selected base text characters 402 and 404, respectively.

Figure 7D:
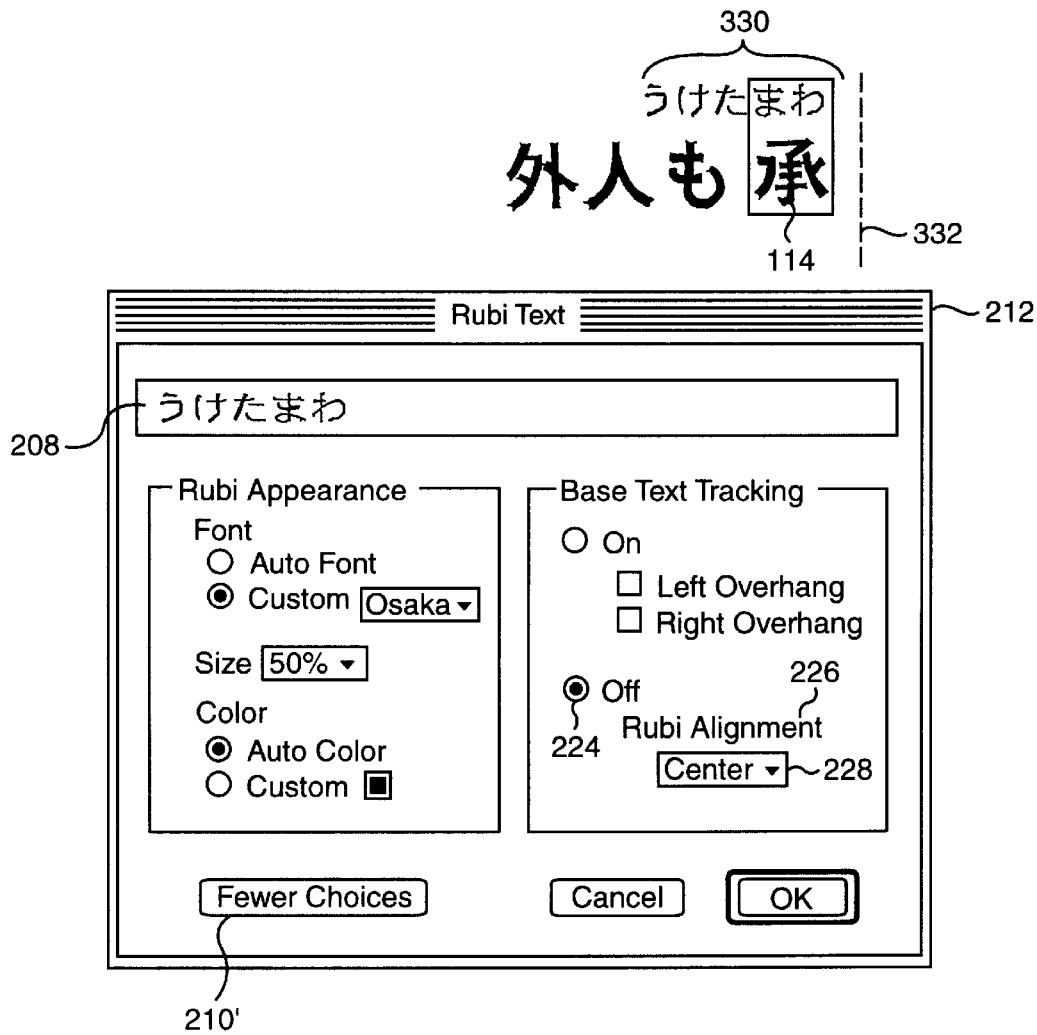
FIG. 7D illustrates a custom rubi text dialog used to select a rubi alignment feature in accordance with one embodiment of the present invention.

FIG. 7D illustrates a custom rubi text dialog 212 being used to select a rubi alignment feature 226 in accordance with one embodiment of the present invention. When rubi alignment 226 is enabled and a user selects "right" alignment from a pull-down menu 228, the typed-in rubi text will be right aligned over the selected base text character. In this manner, the rightmost rubi character is aligned with the rightmost edge of the selected base text character. In this example, when kanji character 114 is at a rightmost edge 332 of a text document (i.e., right margin), the user may not want the rubi annotation to wrap-around to the next line. To prevent a warp-around, right alignment is selected for rubi characters 330 annotating kanji character 114. Accordingly, rubi characters 330 are shifted to the left so that the last rubi character is aligned with the rightmost edge of kanji character 114. As can be appreciated, having right and left alignment provides a user with advantageous modularity and the ability to custom design the layout of rubi annotating characters, even when margins restrict text layout.

Figure 8:
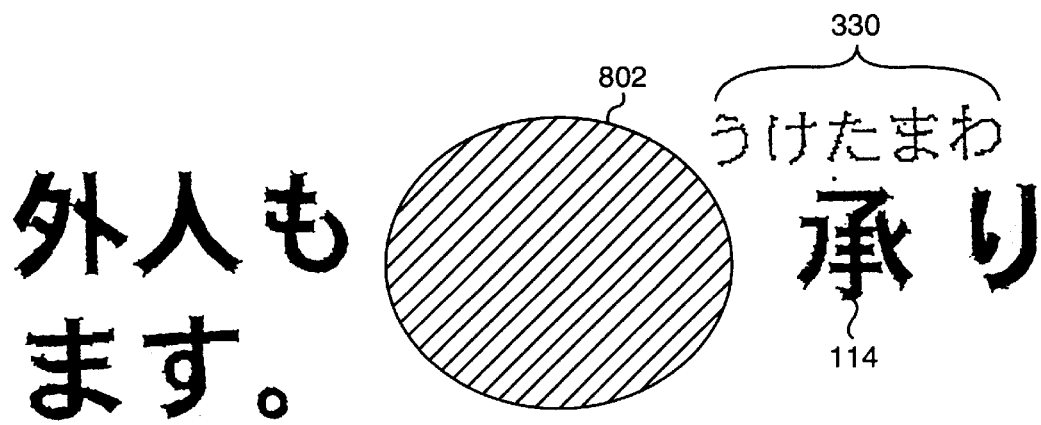
FIG. 8 shows an object inserted into a text document having rubi annotation characters in accordance with one embodiment of the present invention.

FIG. 8 illustrates, in accordance with a further embodiment, an object 802 that is inserted into a text document having rubi annotation. In this embodiment, when an object 802 is placed in between existing base text and rubi text, the rubi text and base text is appropriately spaced apart to accommodate object 802. Advantageously, even the addition of objects (i.e., graphics, spread sheets, etc.) within text document containing rubi annotation does not disrupt base text tracking, rubi text tracking or alignment formatting.

Figure 9:
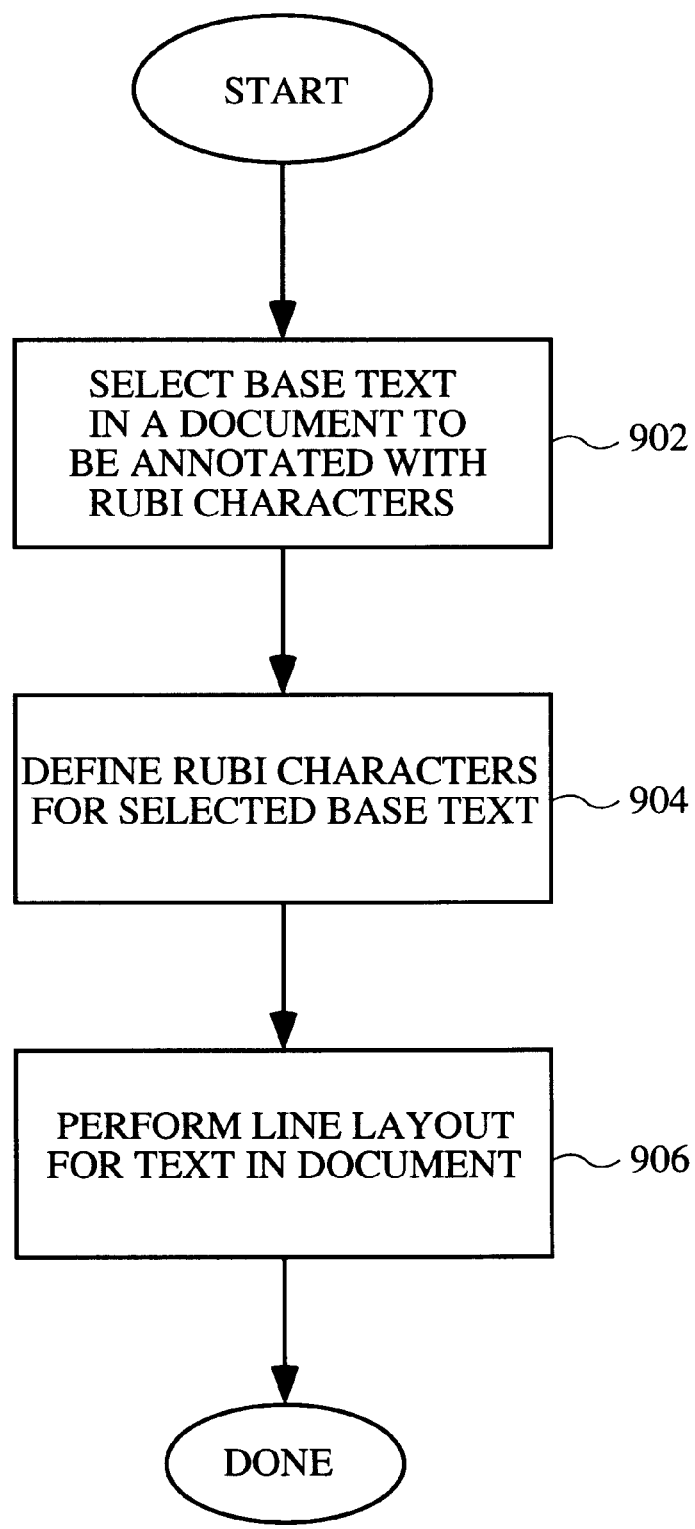
FIG. 9 is an overview flowchart illustrating preferred operations for applying rubi annotation characters over underlying base text characters in accordance with one embodiment of the present invention.

FIG. 9 is an overview flowchart illustrating preferred operations for applying rubi annotation characters over underlying base text characters in accordance with one embodiment of the present invention. The method begins at an operation 902 where the base text in a document requiring rubi annotation characters is selected. As an example, as shown in FIG. 2A, kanji character 114 was selected for the application of rubi annotation characters by selecting rubi option 204 from a text menu item 202 of FIG. 2B. Once the desired base text is selected to receive rubi annotation characters, the method proceeds to an operation 904 where the rubi characters are defined for the selected base text.

As shown in FIG. 2C, the desired rubi characters are input into rubi field 208. Once the desired rubi characters have been input and the user selects an "OK" button to initiate the application of rubi characters, the method will proceed to an operation 906. In operation 906, line layout for the document will be performed. That is, once the rubi annotation has been performed, either rubi tracking or base text tracking will occur based on the length of the respective rubi characters and the underlying selected base text characters. Once line layout has been performed for the entire document, the method will be done.

Figure 10:
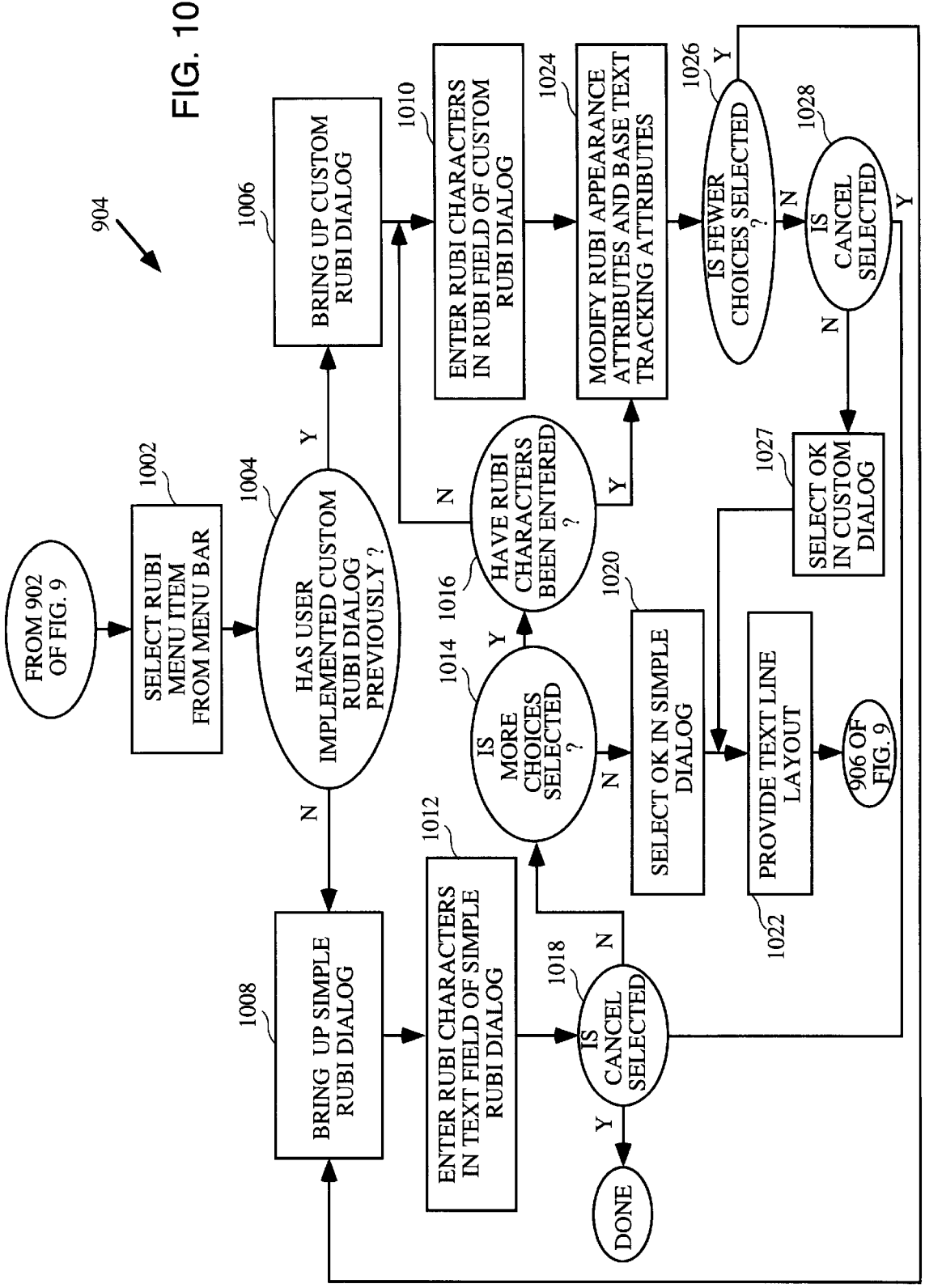
FIG. 10 is a more detailed flowchart illustrating the method operations associated with defining rubi characters for selected base text in a document for rubi annotation in accordance with one embodiment of the present invention.

FIG. 10 is a more detailed flowchart illustrating the method operations associated with defining rubi characters for selected base text in a document for rubi annotation. The method begins at an operation 1002 where a rubi menu item is selected from a menu bar to initiate the application of rubi text over the selected base text characters. Once the rubi menu item is selected from the menu bar, the method will proceed to a decision operation 1004 where it is determined whether the user has implemented a custom rubi dialog previously.

By way of example, if the user has previously used the rubi selection from the menu bar and used a custom rubi dialog (i.e., selected "more choices" button), then the next use of the rubi item from the menu bar will automatically bring up the previously used custom rubi dialog. Accordingly, if it is determined in operation 1004 that the user has previously implemented the custom rubi dialog, then the method will proceed to an operation 1006. In operation 1006, the custom rubi dialog will be presented to the user. As an example, the custom rubi dialog is analogous to custom rubi dialog 212 of FIG. 2D. On the other hand, if the user has not previously implemented the custom rubi dialog, then the method will proceed to an operation 1008. In operation 1008, a simple rubi dialog is presented to the user. As described with reference to FIG. 2C, a simple rubi dialog is analogous to simple rubi dialog 206.

Assuming first that the user has not previously used the custom rubi dialog, the method will proceed to an operation 1012 where the user may enter rubi characters in a rubi field 208 of the simple rubi dialog. Once the user has entered the desired rubi characters that may be any suitable kana-type characters suited to facilitate pronunciation and understanding of the underlying base text, the method will proceed to a decision operation 1018. In decision operation 1018, it is determined whether cancel is selected. If cancel is selected, then the method will be done, indicating that the user no longer desires to implement rubi characters.

On the other hand, if cancel is not selected, then the method will proceed to a decision operation 1014 where it is determined whether the "more choices" button is selected. As an example, the simple rubi text dialog 206 of FIG. 2C illustrates the "more choices" button 210. If selected, the method will proceed to a decision operation 1016 where it is determined if rubi characters have been entered previously. On the other hand, if it is determined in operation 1014 that more choices was not selected, then the method will proceed to an operation 1020 where the user may select an "OK" button in the simple dialog. Once the user has selected "OK" in the simple dialog, the method will proceed to an operation 1022, where text line layout is performed for the document.

Referring again to decision operation 1016, if it is determined that rubi characters have been entered previously in the simple rubi dialog, then the method will proceed to an operation 1024, where the rubi appearance attributes (i.e., font size, color, etc.) and the base text tracking attributes (i.e., tracking ON, alignment ON, etc.) may be modified. On the other hand, if it is determined in operation 1016 that rubi characters have not been entered previously, then the method will proceed to an operation 1010. In operation 1010, rubi characters may be entered in the rubi field of the custom rubi dialog. As an example, the rubi characters entered into rubi field 208 of FIG. 2D define the desired rubi annotation.

Once the rubi characters are entered in the rubi field of the custom rubi dialog in operation 1010, the method proceeds to operation 1024 where the rubi appearance attributes and the base text tracking attributes may be modified as described above. If the base text tracking is modified to ON in operation 1024, either the base text or the rubi text is tracked depending on their respective lengths. On the other hand, the user may select rubi alignment which necessarily switches OFF base text tracking as described above. Once the rubi appearance attributes and the base text tracking attributes are modified, if appropriate in operation 1024, the method proceeds to a decision operation 1026 where it is determined if "fewer choices" 210' of FIG. 2D is selected. If fewer choices is selected, then the method will proceed to an operation 1008, where the simple rubi dialog is presented to the user.

On the other hand, if fewer choices was not selected, the method will then proceed to a decision operation 1028 where it is determined if cancel is selected. If cancel is selected, then the method will be done and no rubi annotation will be applied. On the other hand, if cancel is not selected, the method will proceed to an operation 1027 where "OK" is selected in the custom rubi dialog. Once "OK" is selected in the custom rubi dialog in operation 1027, the method will proceed to operation 1022 where text line layout is provided for the entire document.

Referring again to decision operation 1026. If fewer choices was selected, the method proceeds to operation 1008 where the simple rubi dialog is again brought up. In this embodiment, the rubi annotation characters input into the custom rubi dialog are maintained in the rubi field, and the method proceeds to an operation 1012 where the rubi characters in a text field of the simple rubi dialog may be entered. However, because the rubi characters have already been entered, the method will proceed to a decision step 1018 where it is again determined if cancel is selected. If cancel is not selected, then the method will proceed to a decision operation 1014 where it is determined if more choices is selected. At this point, it is assumed that more choices will not be selected since fewer choices 1026 was selected earlier. Therefore, the method proceeds to an operation 1020 where "OK" is selected from the simple dialog. Once "OK" is selected in the simple dialog in operation 1020, the method will proceed to an operation 1022 where text line layout is provided. The method now proceeds to operation 906 of FIG. 9.

Figure 11A:
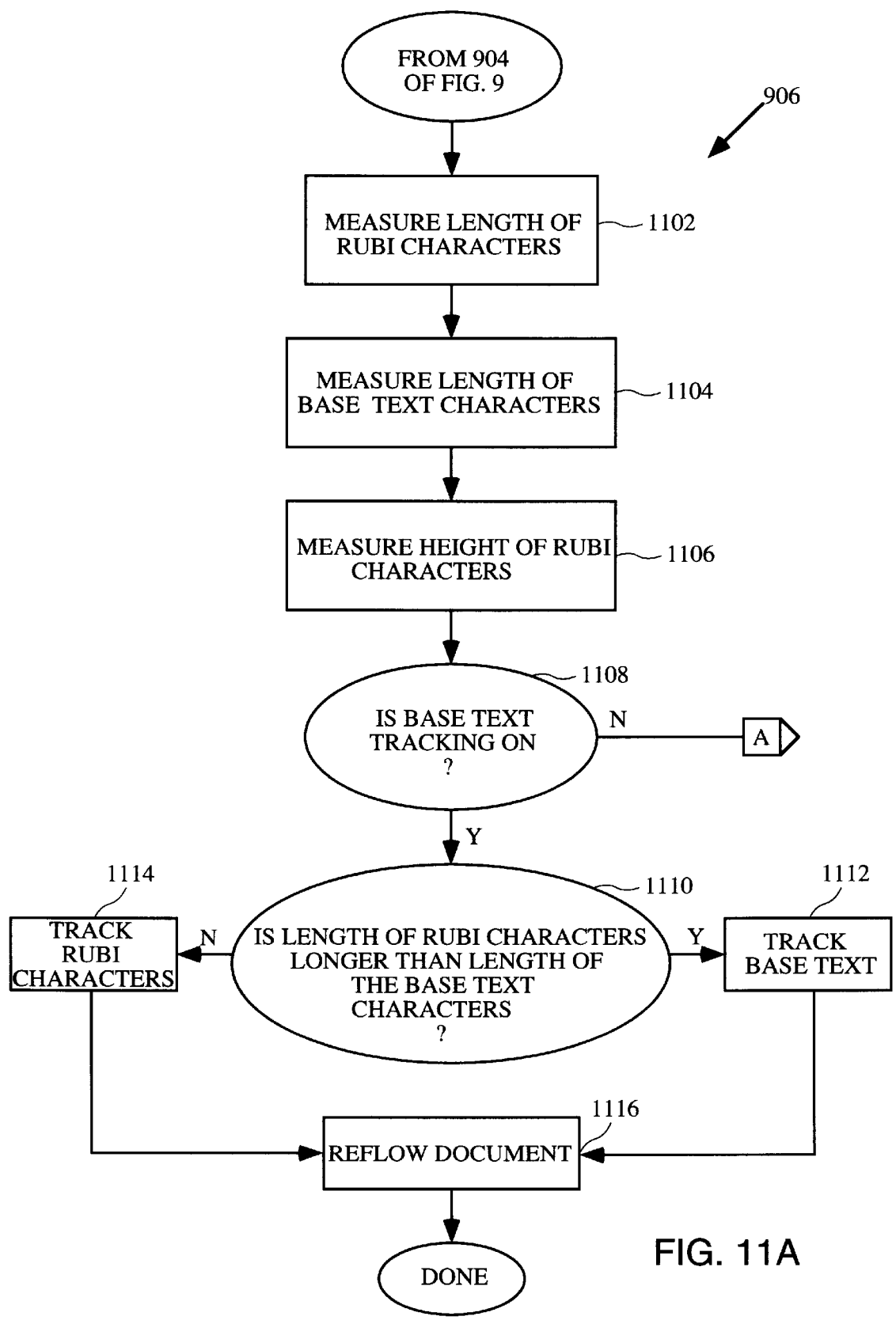
FIG. 11A is a more detailed flowchart diagram of the method operations associated with performing line layout in a document in accordance with one embodiment of the present invention.

FIG. 11A is a more detailed flowchart diagram of the method operations associated with performing line layout for text in a document in operation 906 of FIG. 9. The method begins at an operation 1102 where the length of the rubi characters is measured. In this embodiment, the length of the rubi characters ($R_L$) is preferably the sum of the widths for each of the rubi characters ($R_W$). Once the length of the rubi characters has been measured in operation 1102, the method proceeds to an operation 1104 where the length of the base text characters ($B_L$) is measured. In a like manner, the length of the base text characters will be the sum of the individual widths of each base text character.

Once the length of the base text characters is measured in operation 1104, the method proceeds to an operation 1106 where the height of the rubi characters is measured. In this embodiment, the height of the rubi characters is measured to ascertain the appropriate line layout of an entire document. In this manner, base text characters located in lines directly above the rubi annotation will be appropriately spaced apart during line layout. Once the height of the rubi characters is measured in operation 1106, the method proceeds to a decision operation 1108 where it is determined if base text tracking is on.

As described with reference to FIG. 2D, if base text tracking is "on" 218, then the base text or the rubi text will be tracked, depending on the respective lengths. On the other hand, if base text tracking is not "on" 218, then the method will proceed to "A" of FIG. 11B. Assuming that base text tracking is on in operation 1108, the method will then proceed to a decision operation 1110, where it is determined if the length of the rubi characters is longer than the length of the base text characters. If it is determined that the length of the rubi characters is longer than the base text characters, the method will proceed to an operation 1112 where base text tracking is preferably performed. Once base text tracking is performed in operation 1112, the method will then proceed to an operation 1116 where the document is reflowed to provide the appropriate line layout.

Once line layout is performed, the method will be done. On the other hand, if it is determined in decision operation 1110, that the length of the rubi characters is not longer than the base text characters, then the method will proceed to an operation 1114 where the rubi characters are tracked. By way of example, if the length of the rubi characters is shorter than the length of the underlying base text characters, the rubi characters will be spaced apart in order to provide a more fluid and easy to read annotation. Once the rubi characters are tracked in operation 1114, the method will then proceed to operation 1116 where the document is reflowed to provide an appropriate line layout for the entire document. Once the document has been reflowed, then the method will be done.

Figure 11B:
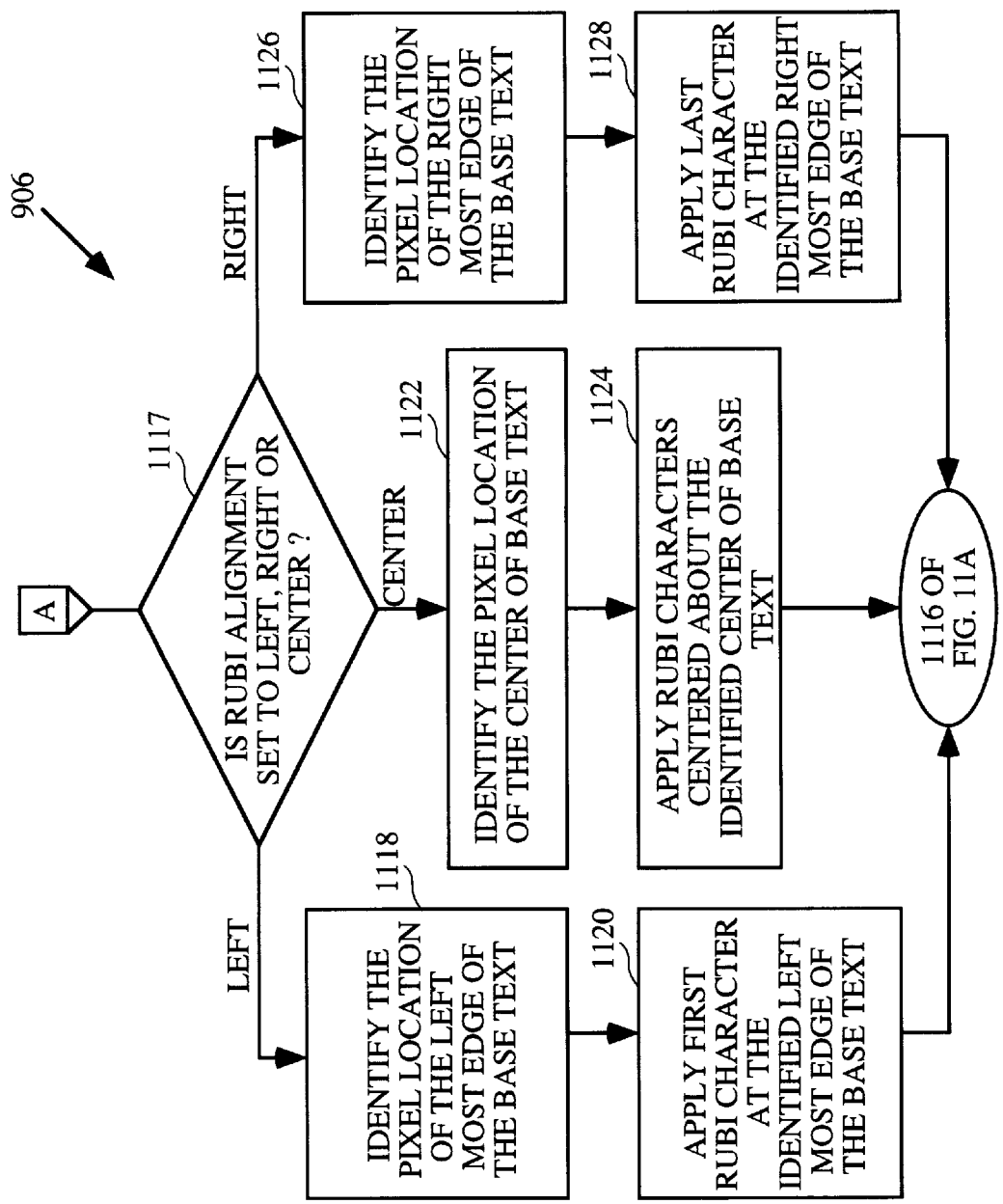
FIG. 11B is the continuation of the more detailed flowchart diagram of FIG. 11A in accordance with one embodiment of the present invention.

FIG. 11B is the continuation of a flowchart diagram of FIG. 11A in accordance with one embodiment of the present invention. Beginning from "A," the method will proceed to a decision operation 1117 where it is determined whether rubi alignment is set to left, right or center. With reference to FIG. 2D, if rubi alignment is selected and the radio button 224 is selected OFF, then base text tracking will not be "on" 218. In one embodiment, if rubi alignment is set to left, then the method will proceed to an operation 1118 where the pixel location of the leftmost edge of the selected base text is identified. Once this location has been identified, the method will proceed to an operation 1120 where the first rubi character is applied beginning at the leftmost edge of the base text characters, and the remaining rubi characters are equally spaced apart to the right over successive underlying base text characters.

On the other hand, if it is determined in decision operation 1117 that "center alignment" is selected, then the method will proceed to an operation 1122. In operation 1122, the pixel location of the center of the underlying selected base text will be identified. Once this location has been identified in operation 1122, the method will proceed to an operation 1124 where the rubi characters are applied about a center of the identified underlying selected base text characters. In this manner, the rubi characters are equally spaced apart overlying the selected base text characters as described with reference to FIG. 7C above.

Finally, if it is determined that "right alignment" is selected in operation 1117, the method will proceed to an operation 1126 where the pixel location of the rightmost edge of the underlying selected base text is identified. Once this location has been identified, the method proceeds to an operation 1128. In operation 1128, the rubi characters are applied beginning with the last rubi character being aligned with the identified rightmost edge of the underlying selected base text, and all remaining rubi characters being equally spaced apart are shifted left. By way of example, as shown in FIG. 7D, right alignment was selected and the selected underlying kanji character 114 defines the rightmost edge from which the overlying annotation rubi characters are applied. Once the appropriate alignment has been applied, the method will proceed to an operation 1116 of FIG. 11A where the document is reflowed as described above.

Figure 12:
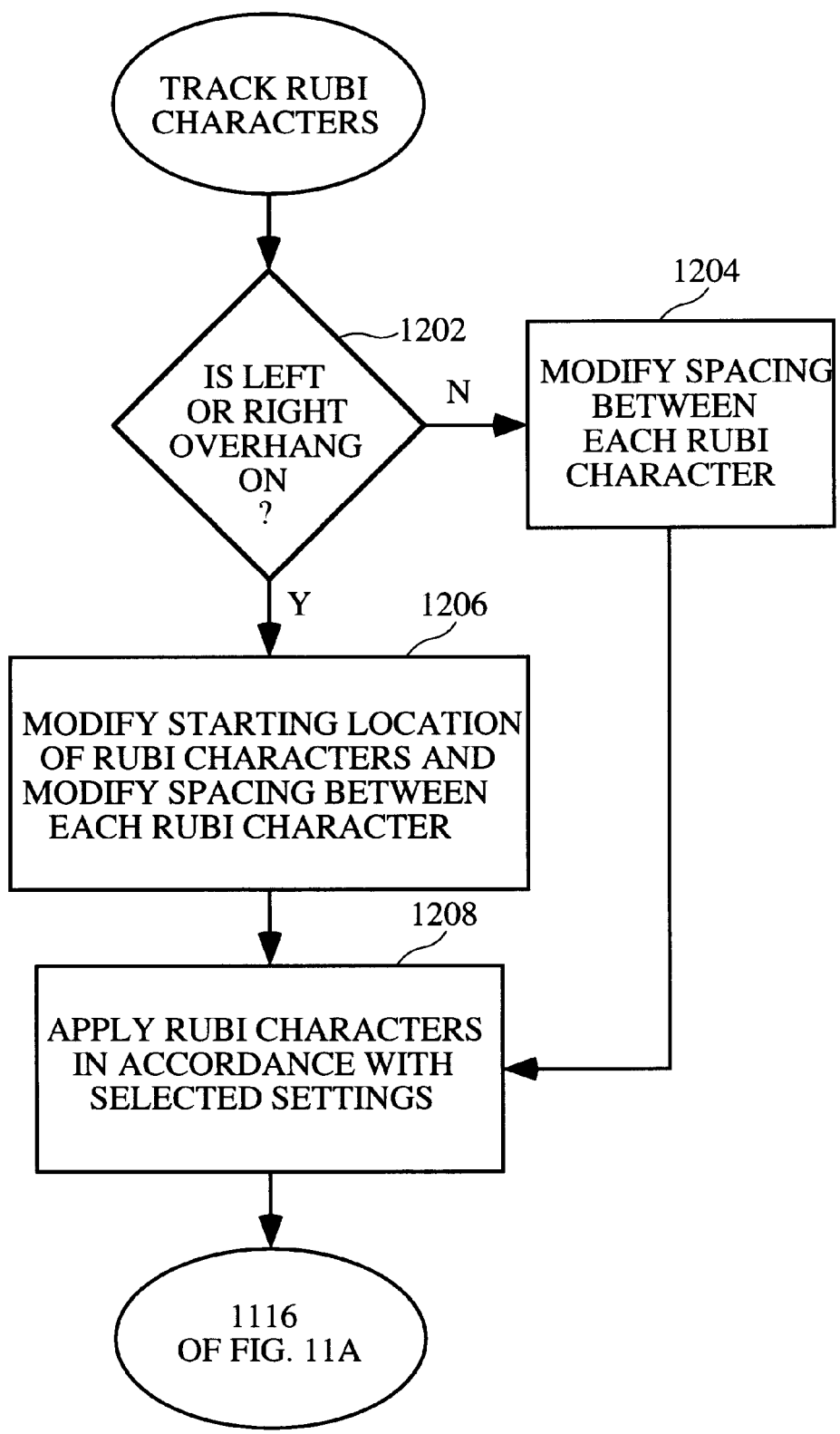
FIG. 12 is a more detailed flowchart diagram illustrating the preferred operations for performing rubi tracking in accordance with one embodiment of the present invention.

FIG. 12 is a more detailed flowchart diagram illustrating the preferred operations for performing rubi tracking in accordance with one embodiment of the present invention. If rubi tracking is desired as described in operation 1114 of FIG. 11A, the method will proceed to a decision operation 1202 where it is determined if the left or the right overhang selection box is on. If it is determined that either the right or the left overhang is on, then the method will proceed to an operation 1206 where the starting location of the rubi characters is modified and the spacings between each rubi character is modified.

In other words, as shown in FIGS. 5A and 5B, if left overhang or right overhang is selected, then the calculated overall rubi length $R_L$ will not include the width $R_W$ of the rubi character allowed to overhang over a non-selected underlying base text character. Once the starting location of the rubi characters and the spacing between each rubi character is modified in operation 1206, the method will proceed to an operation 1208 where the rubi characters are applied over the base text in accordance with the selected text settings (i.e., in a tracked format). By way of example, because rubi tracking is preferably only performed when the overall length of the selected base text is greater than the length of the annotated rubi characters, the rubi characters are tracked-out to provide a more pleasing presentation to the reader.

Once the rubi characters are applied with the appropriate spacing in operation 1208, the method will proceed to operation 1116 of FIG. 11A where the document is reflowed as described above. On the other hand, if it is determined in operation 1202 that neither right nor left overhang is on, then the method will proceed to an operation 1204 where the spacing between each rubi character is modified. In other words, the rubi characters are tracked-out to provide a more even distribution over the wider underlying selected base text characters. Once the rubi spacing between each character is modified, the rubi characters are applied over the selected underlying base text characters in operation 1208. The method will then again proceed to operation 1116 of FIG. 11A where the document is reflowed.

Figure 13:
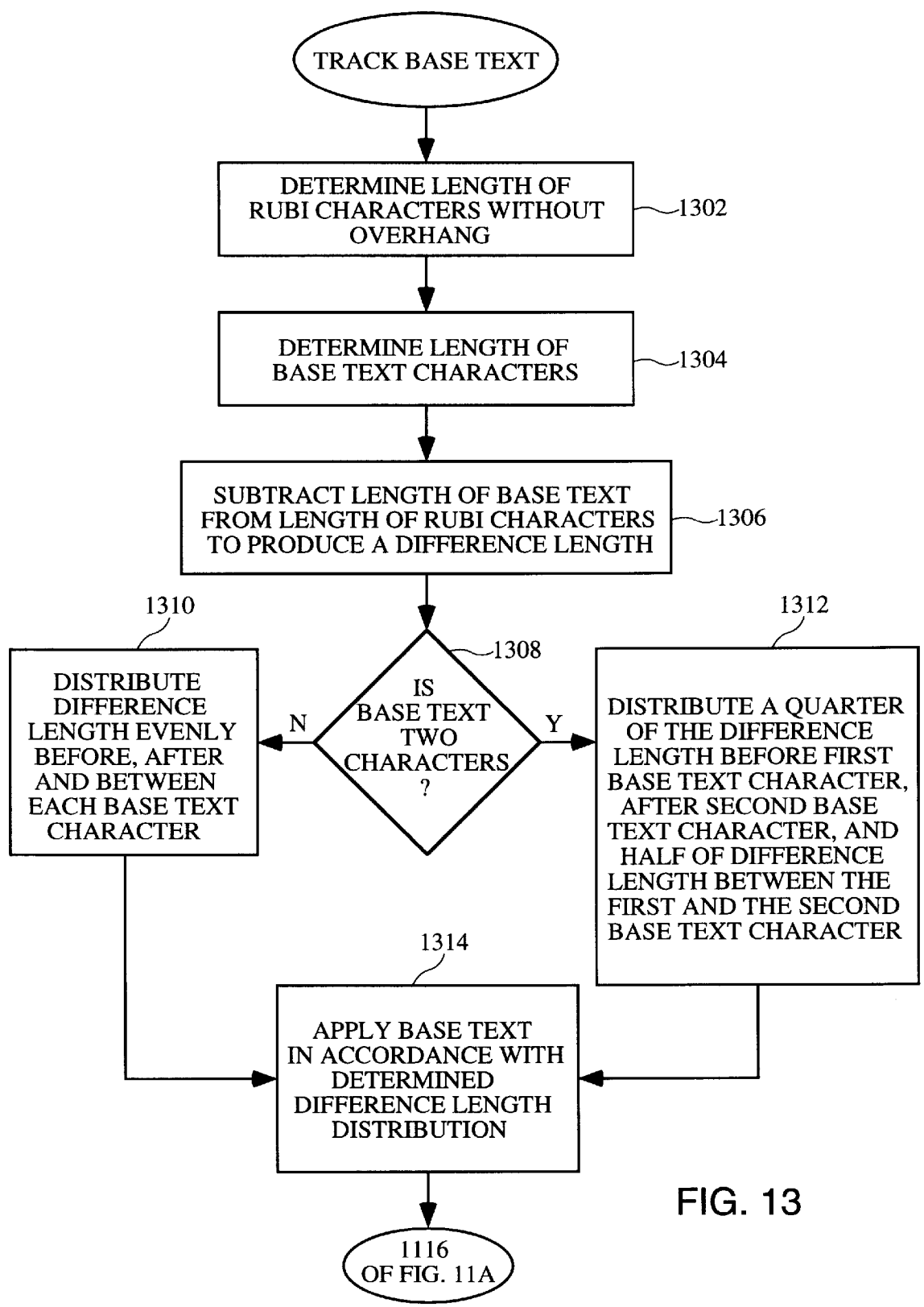
FIG. 13 is a more detailed flowchart diagram illustrating the preferred operations associated with performing base text tracking in accordance with one embodiment of the present invention.

FIG. 13 is a more detailed flowchart diagram illustrating the preferred operations associated with performing base text tracking (denoted as 1112 in FIG. 11A) in accordance with one embodiment of the present invention. The method begins at an operation 1302 where the length of the rubi characters without overhang is determined. By way of example, in FIG. 5A above, the rubi length ($R_L$) does not include the width of rubi character 1 ($R_W$), and therefore only includes an overall length of rubi characters 2 through 6. Once the length of the rubi characters without overhang has been determined in operation 1302, the method proceeds to an operation 1304.

In operation 1304, the length of the underlying selected base text characters is determined. Once the length of the underlying selected base text characters is determined in operation 1304, the method proceeds to an operation 1306 where the length $B_L$ of the base text characters is subtracted from the length $R_L$ of the rubi characters to produce a different length $D_L$. Once the different length $D_L$ has been determined in operation 1306, the method proceeds to a decision operation 1308.

In decision operation 1308, a determination is made as to whether the underlying selected base text is "two" characters. If there are more than two selected base text characters, then the method will proceed to an operation 1312 where a quarter ($¼D_L$) of the difference length is distributed before the selected base text character, and a quarter ($¼D_L$) is distributed after the second selected base text character. In addition, the remaining half ($½D_L$) of the difference length is distributed between the first and the second base text character as illustrated in FIG. 4B above. Once the appropriate distribution has been determined in operation 1312, the method will proceed to an operation 1314 where the base text is applied in accordance with the determined length distributions.

Referring back to decision operation 1308, if it is determined that the selected base text characters are not "two" characters, then the method will proceed to an operation 1310 where the difference length $D_L$ is evenly distributed before, after and between each selected base text character. By way of example, FIG. 4C shows a situation where three base text characters are selected, and a difference length $D_L$ is evenly distributed one-fourth ($¼D_L$) before, after and between the selected base text characters. The method then proceeds to an operation 1314 where the base text is applied in accordance with the determined difference length distribution. Once applied, the method again reverts to operation 1116 where the entire document is reflowed (denoted as 1116 in FIG. 11A).

The invention employs various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 14:
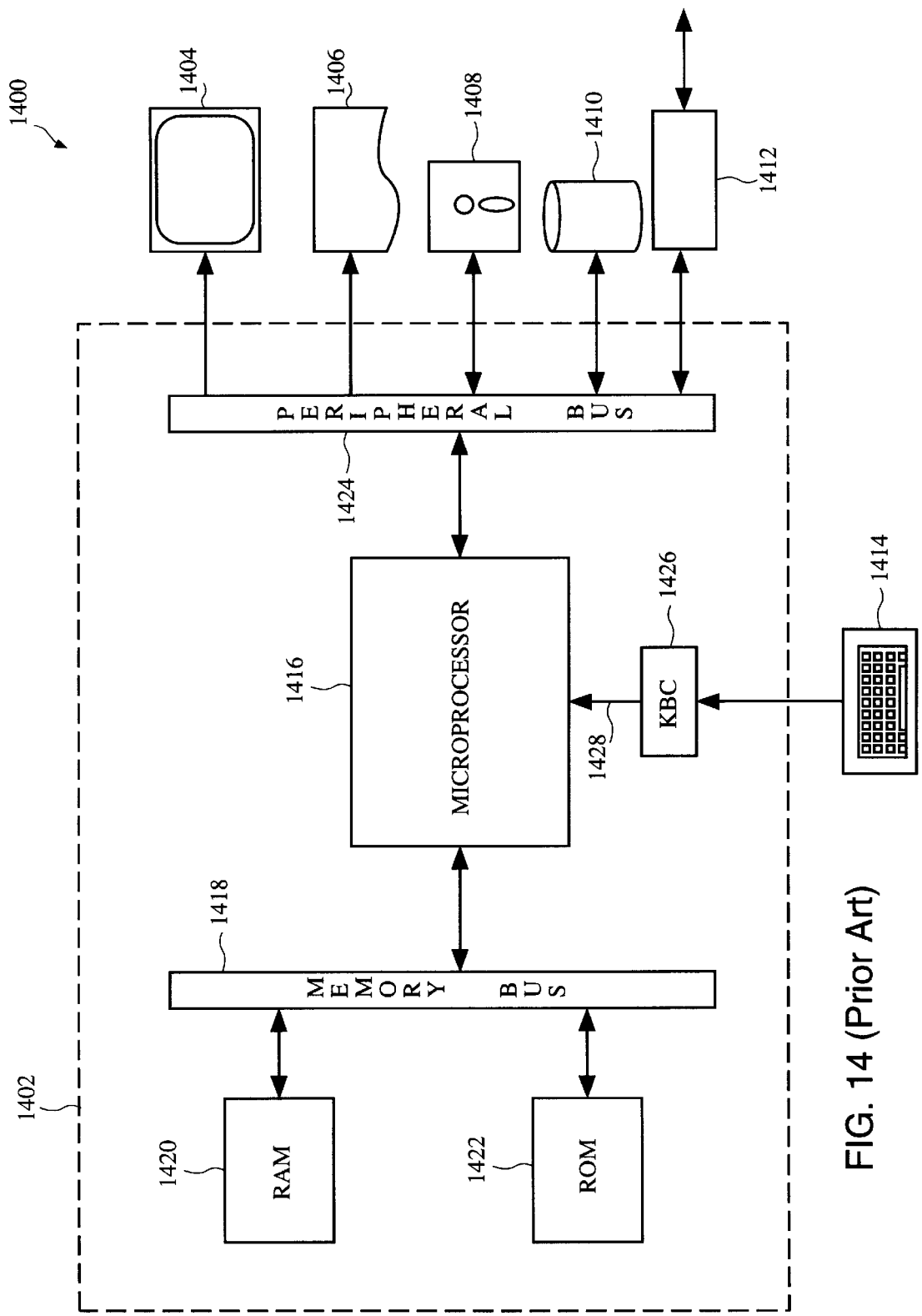
FIG. 14 is a block diagram of an exemplary computer system for carrying out the processing according to the invention.

FIG. 14 is a block diagram of an exemplary computer system 1400 for carrying out the processing according to the invention. The computer system 1400 includes a digital computer 1402, a display screen (or monitor) 1404, a printer 1406, a floppy disk drive 1408, a hard disk drive 1410, a network interface 1412, and a keyboard 1414. The digital computer 1402 includes a microprocessor 1416, a memory bus 1418, random access memory (RAM) 1420, read only memory (ROM) 1422, a peripheral bus 1424, and a keyboard controller 1426. The digital computer 1400 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 1416 is a general purpose digital processor which controls the operation of the computer system 1400. The microprocessor 1416 can be a single-chip processor or can be implemented with multiple components. Using instructions retrieved from memory, the microprocessor 1416 controls the reception and manipulation of input data and the output and display of data on output devices. According to the invention, a particular function of microprocessor 1416 is to process the selected rubi annotation requests and to assist in processing any required tracking operations.

The memory bus 1418 is used by the microprocessor 1416 to access the RAM 1420 and the ROM 1422. The RAM 1420 is used by the microprocessor 1416 as a general storage area and as scratch-pad memory, and can also be used to store input data and processed data. The ROM 1422 can be used to store instructions or program code followed by the microprocessor 1416 as well as other data.

The peripheral bus 1424 is used to access the input, output, and storage devices used by the digital computer 1402. In the described embodiment, these devices include the display screen 1404, the printer device 1406, the floppy disk drive 1408, the hard disk drive 1410, and the network interface 1412. The keyboard controller 1426 is used to receive input from keyboard 1414 and send decoded symbols for each pressed key to microprocessor 1416 over bus 1428.

The display screen 1404 is an output device that displays images of data provided by the microprocessor 1416 via the peripheral bus 1424 or provided by other components in the computer system 1400. The printer device 1406 when operating as a printer provides an image on a sheet of paper or a similar surface. Other output devices such as a plotter, typesetter, etc. can be used in place of, or in addition to, the printer device 1406.

The floppy disk drive 1408 and the hard disk drive 1410 can be used to store various types of data. The floppy disk drive 1408 facilitates transporting such data to other computer systems, and hard disk drive 1410 permits fast access to large amounts of stored data.

The microprocessor 1416 together with an operating system operate to execute computer code and produce and use data. The computer code and data may reside on the RAM 1420, the ROM 1422, or the hard disk drive 1410. The computer code and data could also reside on a removable program medium and loaded or installed onto the computer system 1400 when needed. Removable program mediums include, for example, CD-ROM, PC-CARD, floppy disk and magnetic tape.

The network interface 1412 is used to send and receive data over a network connected to other computer systems. An interface card or similar device and appropriate software implemented by the microprocessor 1416 can be used to connect the computer system 1400 to an existing network and transfer data according to standard protocols.

The keyboard 1414 is used by a user to input commands and other instructions to the computer system 1400. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for annotating text, comprising:
   selecting at least one base text character;
   defining at least one annotating character to be associated with the at least one base text character;
   determining whether a left or a right overhang is selected for the at least one annotating character;
   determining a length for the at least one base text character and the at least one annotating character;
   calculating a difference length between the determined length of the at least one base text character and the at least one annotating character; and
   distributing the difference length before and after the at least one base text character when the at least one base text character has a length that is less than the at least one annotating character.

2. A method for annotating text as recited in claim 1, wherein when the selecting the at least one base text character operates to select two or more base text characters, the distributing operates to distribute the difference length before, between and after the two or more base text characters.

3. A method for annotating text as recited in claim 2, wherein when the selecting the at least one base text character operates to select two base text characters, the distributing operates to distribute one-fourth of the difference length before, one-half of the difference length between, and one-fourth of the difference length after the two base text characters.

4. A method for annotating text as recited in claim 1, wherein when at least one of the left and the right overhang is selected for the at least one annotating character, the determined length of the at least one annotating character is shorted by a width of one or more annotating characters associated with at least one of the left and right overhang.

5. A method for annotating text as recited in claim 4, wherein when the left and the right overhang is selected for the at least one annotating character, the at least one annotating character that is associated with the left and the right overhang overlies a non-selected base text character that is adjacent the at least one base text character.

6. A method for annotating text, comprising:
   selecting at least one base text character;
   defining at least one annotating character to be associated with the at least one base text character;
   determining whether a left or a right overhang is selected for the at least one annotating character;
   determining a length for the at least one base text character and the at least one annotating character;
   calculating a difference length between the determined length of the at least one base text character and the at least one annotating character; and
   distributing the difference length before and after the at least one annotating character when the at least one annotating character has a length that is less than the at least one base text character.

7. A method for annotating text as recited in claim 6, wherein the distributing operates to distribute the difference length before, between and after the at least one annotating character when said defining of the at least one annotating character operates to define two or more annotating characters.

8. A method for annotating text as recited in claim 6, wherein when at least one of the left and the right overhang is selected for the at least one annotating character, the determined length of the at least one annotating character is shorted by a width of one or more annotating characters associated with at least one of the left and right overhang.

9. A method for annotating text as recited in claim 8, wherein when the left and the right overhang is selected for the at least one annotating character, the at least one annotating character that is associated with the left and the right overhang overlies a non-selected base text character that is adjacent the selected at least one base text character.

10. A computer readable media containing program instructions for annotating text, said computer readable media comprising:
   program instructions for selecting at least one base text character;
   program instructions for defining at least one annotating character to be associated with the at least one base text character;
   program instructions for determining whether a left or a right overhang is selected for the at least one annotating character;
   program instructions for determining a length for the at least one base text character and the at least one annotating character;

program instructions for calculating a difference length between the determined length of the at least one base text character and the at least one annotating character;

program instructions for distributing the difference length before and after the at least one base text character when the at least one base text character has a length that is less than the length of the at least one annotating character; and program instructions for distributing the difference length before and after the at least one annotating character when the at least one annotating character has a length that is less than the length of the at least one text character.

11. A computer readable media as recited in claim 10, wherein when the left or the right overhang is selected for the at least one annotating character, the determined length of the at least one annotating character is shorted by a width of one or more annotating characters associated with the left or right overhang.

12. A computer readable media as recited in claim 11, wherein when the left or the right overhang is selected for the at least one annotating character, the at least one annotating character that is associated with the left or the right overhang overlies a non-selected base text character that is adjacent the selected at least one base text character.

13. A method for annotating text, said method comprising:

selecting a base text that is to be annotated, said selected base text including at least one base text character;

receiving one or more annotating characters that are to annotate said selected base text, associating said selected base text with said received one or more annotating characters to form an annotated base text;

receiving a selection that indicates whether to perform a tracking operation or to perform an alignment operation for said annotated base text;

determining whether a left or a right overhang indicator is selected when the tracking operation is to be performed;

performing the track operation with a left or a right overhang operation when the left or right overhang indicator is selected such that at least one of the annotating characters overhangs a base text that is not selected but is adjacent to the selected base text; and performing an alignment operation where one of said annotating characters is aligned with respect to one of left, right and center of said selected base text, when an alignment operation is selected to be performed.

14. A method as recited in claim 13, wherein said performing of track operation comprises:

determining whether the selected base text or the received one or more annotating characters should be tracked;

tracking the base text when it is determined that the base text is to be tracked; and tracking the one or more annotating characters when it is determined that the one or more annotating characters are to be tracked.

15. A method as recited in claim 14, wherein said method determines whether the selected base text or the one or more annotating characters should be tracked by comparing measured lengths of the base text and the one or more annotating characters.

* * * * *